United States Patent Office 3,157,460
Patented Nov. 17, 1964

3,157,460
PROCESS OF CYANOETHYLATING COTTON FIBERS AND GRAFT POLYMERIZING THERETO ACRYLONITRILE WITH IONIZING RADIATION
Jett C. Arthur, Jr., Metairie, and Robert J. Demint, New Orleans, La., assignors to the United States of America as represented by the Secretary of Agriculture
No Drawing. Filed Nov. 25, 1960, Ser. No. 71,836
4 Claims. (Cl. 8—120)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to the preparation of polymers of chemically modified cotton by the treatment of cyanoethylated cotton with acrylonitrile and then to the ionizing radiation-induced grafting of polyacrylonitrile onto the cyanoethylated cotton. This invention has as its objects: (a) modifications of the physical and chemical properties of cotton, particularly increases in acid resistance, increases in elongation-at-break, decreases in stiffness, increases in effective fiber dimensions; and (b) additions and substitutions of a very and unusually high degree of cyanoethyl groups onto the cotton molecule without losing its textile properties.

In recent years the utilization of cotton in textile and other products has been significantly enhanced by chemical modifications of the physical and chemical properties of cotton fibers to impart new and desirable properties. In effecting chemical modifications of cotton, due to the low chemical reactivity of cotton cellulose, concentrated bases, high temperatures, high pressures, or catalysts are used. Generally, many of the physical and chemical modifications of cotton fibers are not completely uniform treatments, except under closely controlled conditions, and also greatly reduce their tensile properties.

Our present invention is an improvement over these processes in that cotton cellulose is first partially cyanoethylated to a degree of substitution of about from .3 to 1.3 cyanoethyl groups per anhydroglucose unit of the cotton cellulose under relatively mild conditions thereby effecting little change in the physical properties of the fibers. However, the introduction of cyanoethyl groups on the cotton cellulose provides sites for the addition of acrylonitrile or polyacrylonitrile. In effect the chemical reactivity of the cotton has been increased. Acrylonitrile monomer is applied to the cyanoethylated cotton fibers and the small molecules of the monomer penetrate the cotton fiber. Then when the treated cotton is irradiated with high energy ionizing radiations, the monomer is polymerized to form high molecular weight polymer within the fiber. The radiation polymerized acrylonitrile can not be extracted out of the fiber with N,N-dimethyl formamide, a commonly used solvent for polyacrylonitrile. The product is also resistant to degradation by concentrated sulfuric acid, indicating the relative permanence of the attachment of radiation polymerized acrylonitrile to the cotton cellulose molecule.

We have discovered unexpectedly that this type of treatment of chemically modified cotton with monomer and then radiation polymerization of the monomer significantly increases the polymer add-on, decreases the stiffness of the new textile product, and increases the elongation-at-break, as compared with similar treatment of unmodified cotton. For example, for unmodified cotton the maximum polymer add-on was about 26 percent based on the cellulose and polymer content compared with 57 percent add-on by the process of our present invention. Similarly the values for average stiffness were 43 grams per tex for treatment, unmodified cotton as compared with 141 grams per tex for untreated cotton, and 11 grams per tex for cotton treated by the process of our present invention; elongation-at-break: 23 percent; 13 percent; and 33 percent, respectively. In chemically modified cotton products requiring improved softness and drape, such as cotton fiber blankets and other cotton products these changes in properties of cotton due to the treatment described in our present invention have particular and important values.

The following examples illustrate our invention in greater detail:

EXAMPLE 1

Cyanoethylated cotton fiber yarn, degree of substitution 1.29 (4 parts), was treated with an aqueous solution containing 32 parts of acrylonitrile monomer, 54 parts of zinc chloride, and 14 parts of water at room temperature by padding on of the solution to give about a four-fold increase in weight of the original yarn. The purpose of zinc chloride is to enhance the solubility of acrylonitrile in water. The solubility of acrylonitrile in water is limited. It is desirable, therefore, for the purpose of insuring an adequate concentration of aqueous acrylonitrile, to utilize the well-known hydrotropic effect of certain inorganic salts. Zinc chloride, magnesium chloride, the nitrate salts of these elements, as well as certain other inorganic salts, when dissolved in water, markedly enhance the water solubility of acrylonitrile. The treated yarn was then irradiated to a dosage of 1,000,000 roentgens by high energy gamma ionizing radiations from radioactive cobalt-60 to radiation polymerize the acrylonitrile monomer. The loosely adhering polymer was removed by overnight extraction of the yarn at 25° C. with N,N-dimethyl formamide solvent. The yarn was then washed with water and dried in a current of air at 25° C. The effects of this treatment on the properties of cyanoethylated cotton fiber containing radiation polymerized acrylonitrile as compared with control yarns are shown in Table 1.

Table I

EFFECT OF RADIATION POLYMERIZATION OF ACRYLONITRILE WITH CYANOETHYLATED COTTON ON ITS POLYMER CONTENT, STIFFNESS, ELONGATION-AT-BREAK, AND RELATED PROPERTIES [1]

| Property of Yarn | Yarn Treatment | | | |
|---|---|---|---|---|
| | Purified | Purified Irradiated | Cyanoethylated | Cyanoethylated Irradiated |
| Polymer content, percent (cellulose plus polymer) | 0 | 26 | 0 | 57 |
| Average stiffness, g./tex | 141 | 43 | 53 | 11 |
| Elongation-at-break, percent | 13 | 23 | 16 | 33 |
| Breaking strength, lbs | 10.1 | 8.8 | 7.0 | 8.5 |
| Breaking toughness, g./tex | 0.79 | 0.73 | 0.50 | 0.59 |
| Yarn number, tex | 241 | 401 | 365 | 1,054 |

[1] Treating solution: 32 parts of acrylonitrile, 54 parts of zinc chloride, and 14 parts of water; radiation dosage: 1,000,000 roentgens from high energy gamma ionizing radiations from radio-active cobalt-60; cyanoethylated yarn: 1.29 degree of substitution.

EXAMPLE 2

Cyanoethylated cotton fiber yarns, having varying degrees of substitution (4 parts), were treated with an aqueous solution containing 32 parts of acrylonitrile monomer, 54 parts of zinc chloride, and 14 parts of water at room temperature by padding on of the solution to give a two- to three-fold increase in weight of the original yarn. The treated yarns were irradiated and then extracted as in Example 1. The effects of degree of substitution on the amount of polymer formed in the cotton and on the properties of the product are shown in Table II.

Table II
EFFECT OF RADIATION POLYMERIZATION OF ACRYLONITRILE WITH CYANOETHYLATED COTTON HAVING VARYING DEGREES OF SUBSTITUTION ON ITS POLYMER CONTENT, STIFFNESS, ELONGATION-AT-BREAK, AND RELATED PROPERTIES [1]

| Property of Yarn | Degree of Substitution of Yarn | | | | | |
|---|---|---|---|---|---|---|
|  | 0.00 | 0.34 | 0.57 | 0.72 | 0.99 | 1.29 |
| Polymer content, percent (cellulose plus polymer) | 26 | 36 | 36 | 40 | 45 | 57 |
| Average stiffness, g./tex | 43 | 22 | 19 | 21 | 18 | 11 |
| Elongation-at-break, percent | 23 | 28 | 29 | 29 | 29 | 33 |
| Breaking strength, lbs | 8.8 | 7.6 | 7.5 | 8.4 | 8.9 | 8.5 |
| Breaking toughness, g./tex | 0.73 | 0.60 | 0.62 | 0.70 | 0.70 | 0.59 |
| Yarn number, tex | 401 | 557 | 590 | 628 | 747 | 1,054 |

[1] Treating solution: 32 parts of acrylonitrile, 54 parts of zinc chloride, and 14 parts of water; radiation dosage: 1,000,000 roentgens from high energy gamma ionizing radiations from radioactive cobalt-60; properties of unirradiated yarns were, respectively: 0.00, 141, 13, 10.1, 0.79, and 241.

EXAMPLE 3

Cyanoethylated cotton fiber yarn, degree of substitution 0.34 (4 parts), was treated with an aqueous solution of acrylonitrile monomer as in Example 1. The treated yarn was irradiated at dosages ranging from zero to 1,000,000 roentgens by high energy gamma ionizing radiations from radioactive cobalt-60 to radiation polymerize the acrylonitrile monomer. The treated yarns were then extracted as in Example 1. The effects of variation in the dosage on the amount of polymer formed in the cotton and on the properties of the product are shown in Table III.

Table III
EFFECT OF RADIATION DOSAGE ON POLYMERIZATION OF ACRYLONITRILE MONOMER WITH CYANOETHYLATED COTTON ON ITS POLYMER CONTENT, STIFFNESS, ELONGATION-AT-BREAK, AND RELATED PROPERTIES [1]

| Property of Yarn | Dosage, 100,000 roentgens | | | | | |
|---|---|---|---|---|---|---|
|  | 0 | 2 | 4 | 6 | 8 | 10 |
| Polymer content, percent (cellulose plus polymer) | 0 | 3.1 | 14 | 21 | 28 | 36 |
| Average stiffness, g./tex | 115 | 96 | 69 | 51 | 35 | 29 |
| Elongation-at-break, percent | 13 | 14 | 16 | 20 | 26 | 29 |
| Breaking strength, lbs | 9.2 | 8.8 | 7.8 | 8.5 | 8.9 | 9.4 |
| Breaking toughness, g./tex | 0.56 | 0.65 | 0.55 | 0.67 | 0.71 | 0.72 |
| Yarn number, tex | 275 | 292 | 321 | 371 | 447 | 509 |

[1] Treating solution: 32 parts of acrylonitrile, 54 parts of zinc chloride, and 14 parts of water; degree of substitution about 0.34; properties of unirradiated yarns were, respectively: 0, 141, 13, 10.1, 0.79, and 241.

We claim:

1. A process for producing cyanoethylated cotton fibers, having degrees of substitution from about 0.3 to 1.3 cyanoethyl groups per anhydroglucose unit of the cotton cellulose, that exhibit textile properties, decreased stiffness, and increased elongation-at-break comprising cyanoethylating the cotton fibers to a degree of substitution from about 0.3 to 1.3 cyanoethyl groups per anhydroglucose unit of the cotton cellulose; padding the cyanoethylated cotton fibers to about a two- to four-fold wet pick-up with an aqueous solution containing about 30 weight percent of acrylonitrile monomer and about 50 weight percent of zinc chloride; irradiating the padded fibers to a dosage ranging from about 200,000 to 1,000,000 roentgens with high energy gamma ionizing radiation from radioactive cobalt-60 to polymerize the acrylonitrile monomer within the cotton fibers to the extent that the irradiated cyanoethylated cotton fibers contain about 35 to 55 weight percent of acrylonitrile polymer; and washing the irradiated, cyanoethylated cotton fibers with N,N-dimethyl formamide to remove the loosely adhering acrylonitrile polymer from the surfaces of the irradiated, cyanoethylated cotton fibers.

2. A process comprising cyanoethylating cotton fibers to a degree of substitution of from about 0.3 to 1.3 cyanoethyl groups per anhydroglucose unit of the cotton cellulose, treating the cyanoethylated cotton fibers with an aqueous solution containing acrylonitrile monomer and a sufficient quantity of an inorganic salt for enhancing the water solubility of the acrylonitrile in the resulting aqueous salt solution to a concentration sufficient to deposit, when polymerized, about from 35 to 55 weight percent of acrylonitrile polymer within the fibers, irradiating the treated fibers to a dosage ranging from about 200,000 to 1,000,000 roentgens with high energy gamma ionizing radiation to polymerize the acrylonitrile monomer within the cotton fibers to the extent that the irradiated fibers contain about from 35 to 55 weight percent of acrylonitrile polymer within the fibers, and removing adhering acrylonitrile polymer from the surfaces of the thus-irradiated cotton fibers by washing them with N,N-dimethyl formamide thereby to obtain cyanoethylated cotton fibers, having degrees of substitution from about 0.3 to 1.3 cyanoethyl groups per anhydroglucose unit of the cotton cellulose, that possess textile properties, and exhibit decreased stiffness and increased elongation-at-break as compared with untreated cotton fibers.

3. A process comprising cyanoethylating cotton fibers to a degree of substitution of from about 0.3 to 1.3 cyanoethyl groups per anhydroglucose unit of the cotton cellulose, padding the cyanoethylated cotton fibers to about a two- to four-fold wet pick-up with an aqueous solution containing about 30 weight percent of acrylonitrile monomer and a sufficient quantity of an inorganic salt for enhancing the water solubility of the acrylonitrile in the resulting aqueous salt solution to a concentration sufficient to deposit, when polymerized, about from 35 to 55 weight percent of acrylonitrile polymer within the fibers, irradiating the padded fibers to a dosage ranging from about 200,000 to 1,000,000 roentgens with high energy gamma ionizing radiation to polymerize the acrylonitrile monomer within the cotton fibers to the extent that the irradiated fibers contain about from 35 to 55 weight percent of acrylonitrile polymer within the fibers, and removing adhering acrylonitrile polymer from the surfaces of the thus-irradiated cotton fibers by washing them with N,N-dimethyl formamide thereby to obtain cyanoethylated cotton fibers, having degrees of substitution from about 0.3 to 1.3 cyanoethyl groups per anhydroglucose unit of the cotton cellulose, that possess textile properties, and exhibit decreased stiffness and increased elongation-at-break as compared with untreated cotton fibers.

4. The process of claim 3 wherein the inorganic salt is zinc chloride.

References Cited in the file of this patent

UNITED STATES PATENTS 2,923,597    Cooke et al. _____ Feb. 2, 1960

FOREIGN PATENTS 809,838    Great Britain _____ Mar. 4, 1959

OTHER REFERENCES

Arthur: Textile Research Journal, September 1959, p. 759, 8-Graft.

Arthur: Textile Research Journal, July 1960, pp. 505–509, 8-Graft.